United States Patent
Su et al.

(10) Patent No.: US 12,278,769 B2
(45) Date of Patent: Apr. 15, 2025

(54) COMMUNICATION EQUIPMENT AND ADAPTIVE QUALITY OF SERVICE SETTING METHOD THEREOF

(71) Applicant: Wistron NeWeb Corporation, Hsinchu (TW)

(72) Inventors: Li-Heng Su, Hsinchu (TW); Ying-Hui Huang, Hsinchu (TW); Horen Chen, Hsinchu (TW); Chuan-Yin Chang, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 244 days.

(21) Appl. No.: 18/150,824

(22) Filed: Jan. 6, 2023

(65) Prior Publication Data

US 2023/0224251 A1     Jul. 13, 2023

Related U.S. Application Data

(60) Provisional application No. 63/323,588, filed on Mar. 25, 2022, provisional application No. 63/298,250, filed on Jan. 11, 2022.

(30) Foreign Application Priority Data

May 31, 2022     (TW) .................................. 111120299

(51) Int. Cl.
*H04L 47/2441*     (2022.01)
*H04L 47/24*     (2022.01)

(52) U.S. Cl.
CPC ...... *H04L 47/2441* (2013.01); *H04L 47/2458* (2013.01)

(58) Field of Classification Search
CPC . H04L 47/2441; H04L 47/2458; H04L 47/24; H04L 47/2433

(Continued)

(56) References Cited

U.S. PATENT DOCUMENTS 8,369,334 B2     2/2013 Yu
11,234,254 B2     1/2022 Hareuveni et al.

(Continued)

FOREIGN PATENT DOCUMENTS

CN     101771627 A     7/2010
TW     202127850 A     7/2021

*Primary Examiner* — Adil Ocak
(74) *Attorney, Agent, or Firm* — McClure, Qualey & Rodack, LLP

(57) ABSTRACT

A communication equipment receives a plurality of network sessions and includes a memory and a processor. The memory stores a plurality of software modules. The processor is connected to the memory and configured to implement the following steps. A network session inferring step is performed to execute an inference software module, and the inference software module processes at least one network packet of each of the network sessions and a packet characteristic module according to a machine learning algorithm to infer a priority level. An adaptive priority list establishing step is performed to execute a classification software module, and the classification software module establishes an adaptive priority list according to the priority levels of the network sessions. The communication equipment transmits the network packets of each of the network sessions to a network according to the adaptive priority list so as to set QoS of the network sessions.

23 Claims, 11 Drawing Sheets

(58) Field of Classification Search
USPC .......................................................... 709/238
See application file for complete search history.

(56) References Cited

U.S. PATENT DOCUMENTS

| | | |
|---|---|---|
| 2017/0094002 A1* | 3/2017 | Kumar ................ H04L 67/1097 |
| 2018/0048589 A1 | 2/2018 | Kulkarni |
| 2019/0327624 A1 | 10/2019 | Raleigh |
| 2020/0374336 A1 | 11/2020 | Murgia |
| 2022/0104127 A1* | 3/2022 | Subramaniam ... H04W 28/0247 |
| 2023/0199565 A1* | 6/2023 | Vannithamby ........ H04W 24/10 |
| | | 370/229 |

* cited by examiner

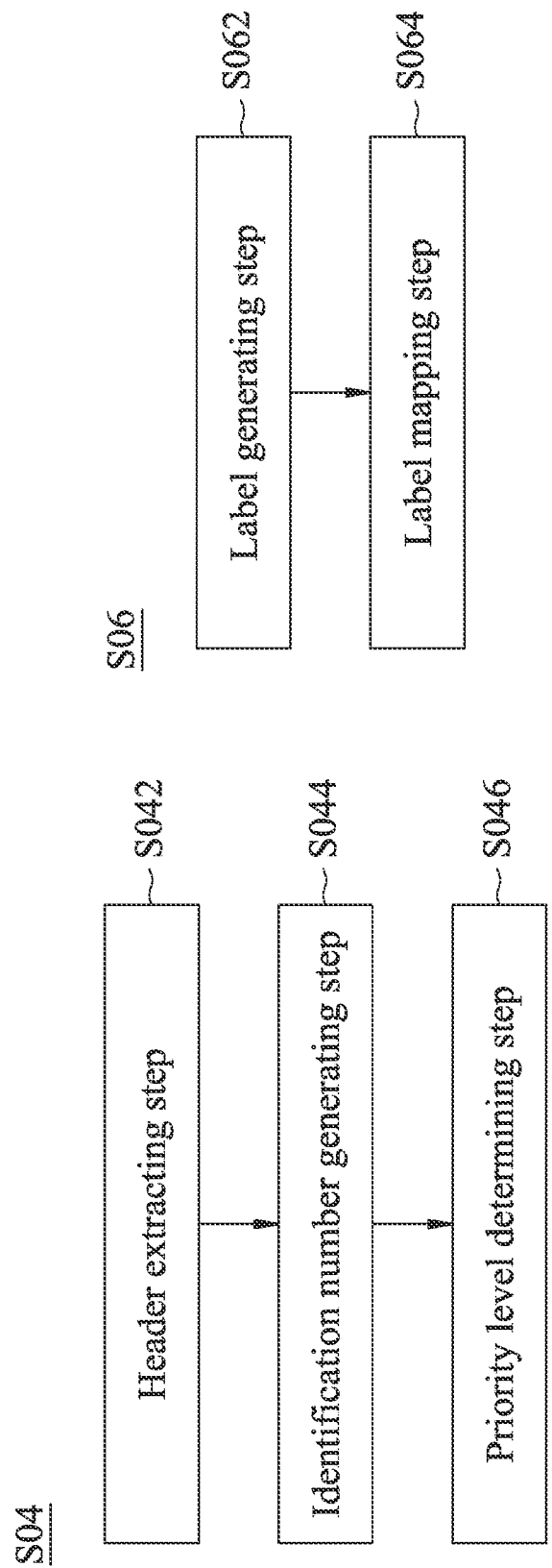

COMMUNICATION EQUIPMENT AND ADAPTIVE QUALITY OF SERVICE SETTING METHOD THEREOF

RELATED APPLICATIONS

This application claims priority to U.S. Provisional Application Ser. No. 63/298,250, filed Jan. 11, 2022, U.S. Provisional Application Ser. No. 63/323,588, filed Mar. 25, 2022 and Taiwan Application Serial Number 111120299, filed May 31, 2022, which are herein incorporated by reference.

BACKGROUND

Technical Field

The present disclosure relates to communication systems. More particularly, the present disclosure relates to a communication equipment and an adaptive quality of service setting method thereof.

Description of Related Art

In data communications, a physical network node can be a Data Communication Equipment (DCE). When a bottleneck occurs in the ingress or egress direction of the DCE, multiple network applications running on the DCE may compete for the limited available network bandwidth. The continual competition results in network congestion and severe application/service degradations caused by network packet delays and/or packet dropouts.

Quality of Service (QoS) is often used for prioritized routing/forwarding of traffic or network packets associated with higher priority applications at network nodes to improve the performance of the applications as they traverse through multiple nodes and networks. However, the conventional way of setting QoS on a network or at a network node requires users to specify complicated parameters and priority levels for each of the applications, but most users do not set advanced options for network application services. Furthermore, a service provider may not trust the priority levels set by its users and wish to double check or change them based on his overall network capabilities, conflicting user service requirements, customized service policy/offerings, etc.

In view of this, there is currently a lack of a communication equipment on the market that can adaptively set QoS for the network sessions generated by the applications, so the relevant industry is looking for its solution.

SUMMARY

According to one aspect of the present disclosure, a communication equipment is connected to a network and configured to adaptively set a Quality of Service (QoS) of a plurality of network sessions received from the network. The communication equipment includes a memory and a processor. The memory stores an inference software module, a classification software module and a packet characteristic module. The processor is connected to the memory and configured to implement an adaptive quality of service setting method including performing a network session inferring step and an adaptive priority list establishing step. The network session inferring step is performed to configure the processor to execute the inference software module. The inference software module processes at least one network packet of each of the network sessions and the packet characteristic module according to a machine learning algorithm to infer a priority level for which each of the network sessions belongs to. The adaptive priority list establishing step is performed to configure the processor to execute the classification software module. The classification software module establishes an adaptive priority list according to a plurality of the priority levels corresponding to the network sessions. The communication equipment transmits a plurality of the network packets of each of the network sessions to the network according to the adaptive priority list so as to set the QoS of the network sessions.

According to another aspect of the present disclosure, an adaptive quality of service setting method is configured to adaptively set a Quality of Service (QoS) of a plurality of network sessions received from a network. The adaptive quality of service setting method includes performing a network packet receiving step, a network session inferring step, an adaptive priority list establishing step and a network packet transmitting step. The network packet receiving step is performed to configure a communication equipment to receive a plurality of network packets of each of the network sessions from the network. The communication equipment includes a processor and a memory, and the memory stores an inference software module, a classification software module and a packet characteristic module. The network session inferring step is performed to configure the processor to execute the inference software module. The inference software module processes at least one of the network packets of each of the network sessions and the packet characteristic module according to a machine learning algorithm to infer a priority level for which each of the network sessions belongs to. The adaptive priority list establishing step is performed to configure the processor to execute the classification software module. The classification software module establishes an adaptive priority list according to a plurality of the priority levels corresponding to the network sessions. The network packet transmitting step is performed to configure the communication equipment to transmit the network packets of each of the network sessions to the network according to the adaptive priority list so as to set the QoS of the network sessions.

BRIEF DESCRIPTION OF THE DRAWINGS

The present disclosure can be more fully understood by reading the following detailed description of the embodiment, with reference made to the accompanying drawings as follows:

FIG. 6 shows a flow chart of a network session inferring step of the adaptive quality of service setting method of FIG. 4.

FIG. 7 shows a flow chart of an adaptive priority list establishing step of the adaptive quality of service setting method of FIG. 4.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected" to another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
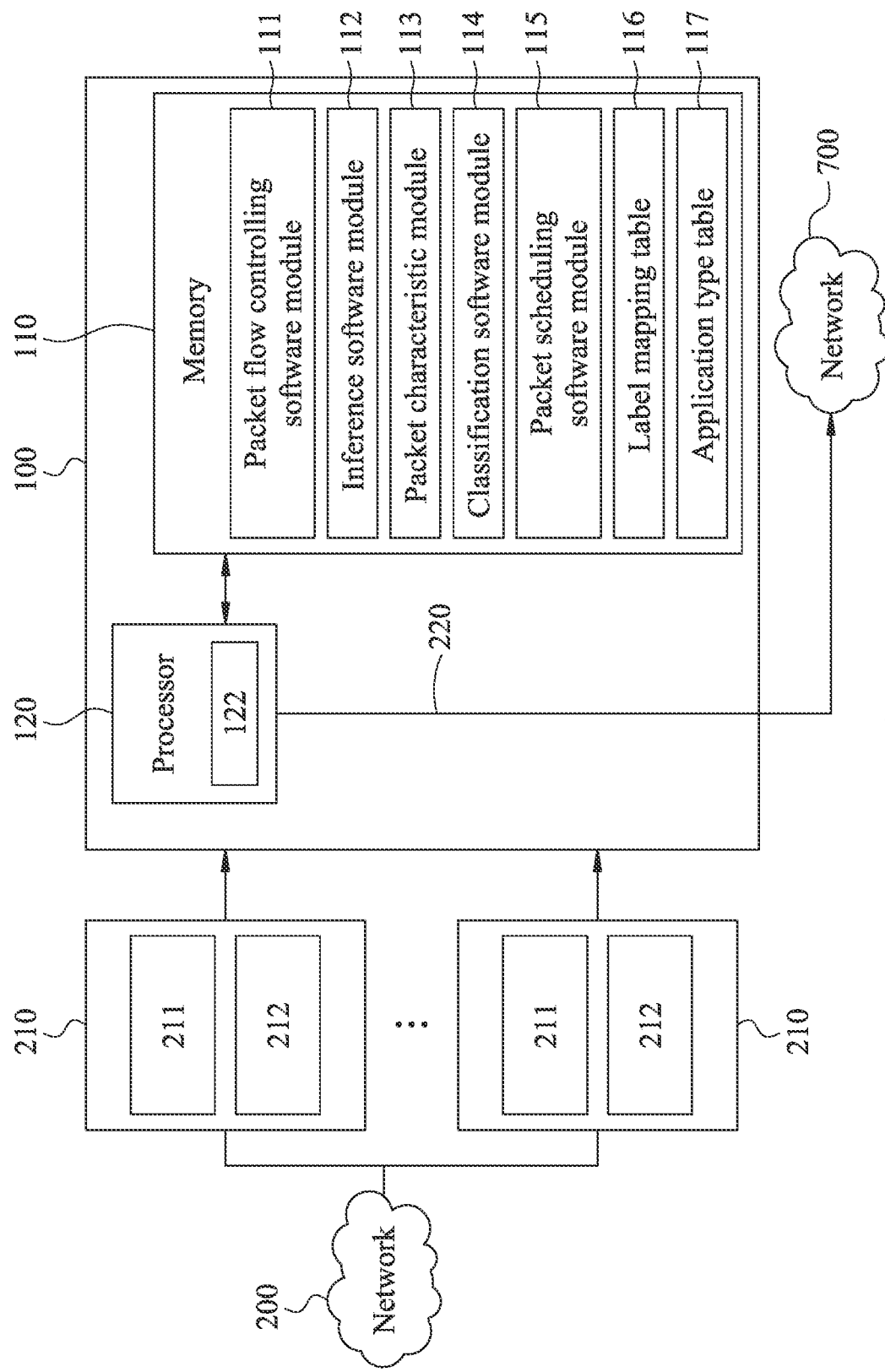
FIG. 1 shows a schematic view of a communication equipment receiving a plurality of network sessions from a network according to a first embodiment of the present disclosure.
Figure 2:
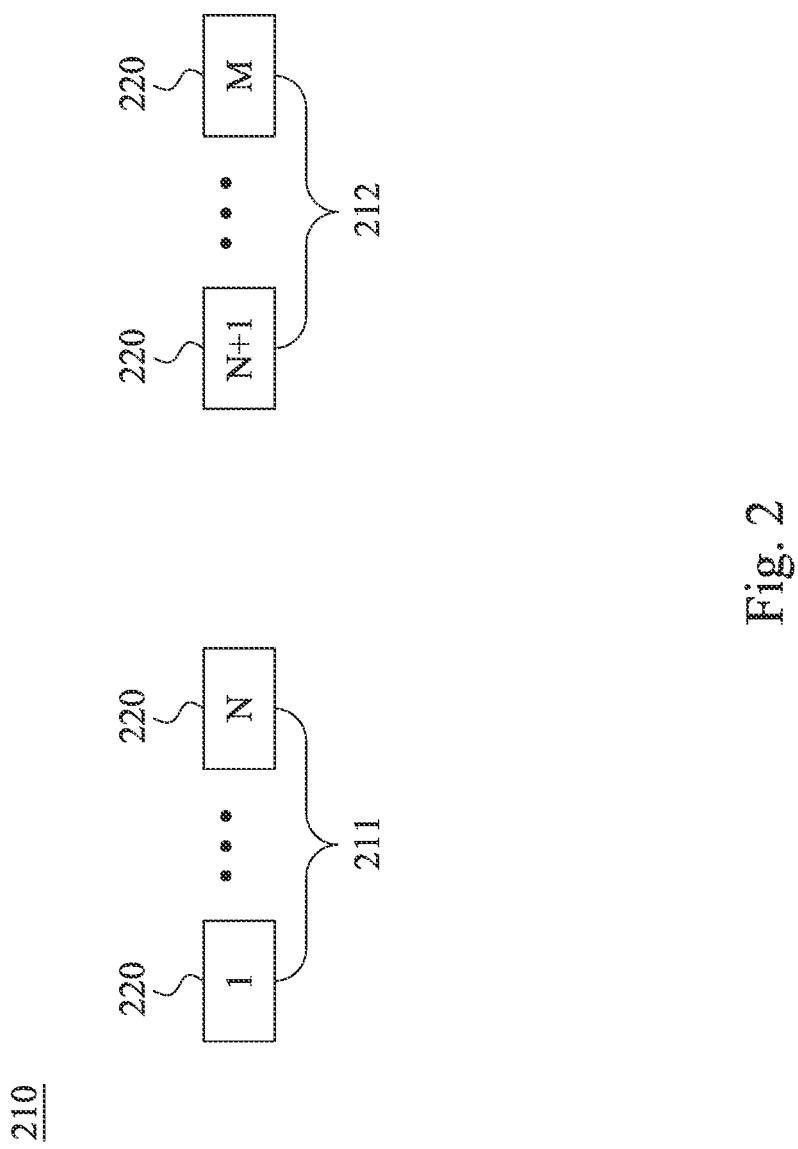
FIG. 2 shows a schematic view of each of the network sessions of FIG. 1.

Please refer to FIGS. 1 and 2. FIG. 1 shows a schematic view of a communication equipment 100 receiving a plurality of network sessions 210 from a network 200 according to a first embodiment of the present disclosure. FIG. 2 shows a schematic view of each of the network sessions 210 of FIG. 1. As shown in FIGS. 1 and 2, the communication equipment 100 is signally connected to the network 200 and receives the network sessions 210 from the network 200. The communication equipment 100 can be configured to adaptively set a Quality of Service (QoS) of the network sessions 210. Each of the network sessions 210 can transmit a plurality of network packets 220 in a communication service (e.g., sending an email). The network packets 220 of each of the network sessions 210 can be grouped into a first packet group 211 and a second packet group 212, and the second packet group 212 is arranged after the first packet group 211.

The communication equipment 100 includes a memory 110 and a processor 120. The memory 110 stores a packet flow controlling software module 111, an inference software module 112, a packet characteristic module 113, a classification software module 114, a packet scheduling software module 115, a label mapping table 116 and an application type table 117. The processor 120 is electrically connected to the memory 110 and configured to implement performing a network session inferring step and an adaptive priority list establishing step. The network session inferring step is performed to configure the processor 120 to execute the inference software module 112. The inference software module 112 processes at least one of the network packets 220 of the first packet group 211 of each of the network sessions 210 and the packet characteristic module 113 according to a machine learning algorithm to infer a priority level for which each of the network sessions 210 belongs to. The adaptive priority list establishing step is performed to configure the processor 120 to execute the classification software module 114. The classification software module 114 establishes an adaptive priority list 122 according to a plurality of the priority levels corresponding to the network sessions 210. The processor 120 of the communication equipment 100 transmits the first packet group 211 and the second packet group 212 of each of the network sessions 210 to another network 700 according to the adaptive priority list 122 so as to set the QoS of the network sessions 210.

In detail, the communication equipment 100 can be a Data Communication Equipment (DCE), such as a Customer-Premises Equipment (CPE), a modem, a gateway, a router, a bridge or a switch. The communication equipment 100 can also be a Data Terminal Equipment (DTE), such as a digital telephone handset, a smart projector, a smart display, a host computer, a Fixed Wireless Access (FWA), a User Equipment (UE), a video conference system or a gaming system. In addition, the memory 110 can be any data storage element, for example, the memory 110 can be a Subscriber Identity Module (SIM), a Read-Only Memory (ROM), a Random-Access Memory (RAM), a Compact Disc Read-Only Memory (CD-ROM), a magnetic tape, a floppy disk or an optical data storage device. The processor 120 can be a Digital Signal Processor (DSP), a Micro Processing Unit (MPU), a Central Processing Unit (CPU) or other electronic processors.

Figure 3:
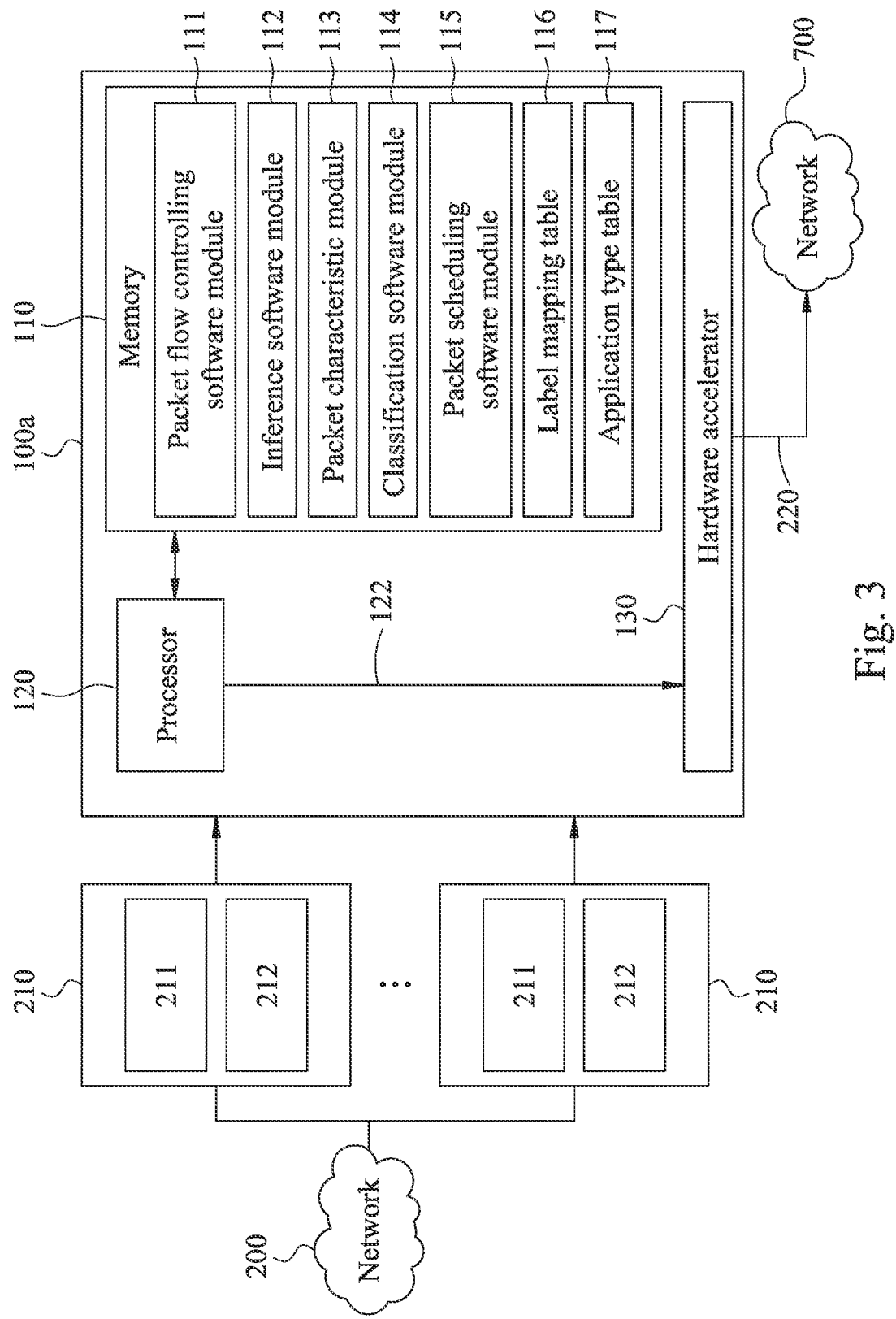
FIG. 3 shows a schematic view of a communication equipment receiving the network sessions from the network according to a second embodiment of the present disclosure.

Please refer to FIG. 3. FIG. 3 shows a schematic view of a communication equipment 100a receiving the network sessions 210 from the network 200 according to a second embodiment of the present disclosure. The communication equipment 100a of the second embodiment includes the memory 110 and the processor 120. Different from the first embodiment, the communication equipment 100a can further include a hardware accelerator 130, which is electrically connected to the processor 120. The communication equipment 100a can transmit the network packets 220 of each of the network sessions 210 to the network 700 more quickly by arranging the hardware accelerator 130. The hardware accelerator 130 can be a Network Processing Unit (NPU), but the present disclosure is not limited thereto. The processor 120 executes the classification software module 114 and writes the adaptive priority list 122 into the hardware accelerator 130, so that the hardware accelerator 130 can transmit the first packet group 211 and the second packet group 212 of each of the network sessions 210 to the network 700 according to the adaptive priority list 122. The communication equipment 100, the communication equipment 100a and other communication equipment of the present disclosure are described in more detail with the drawings below.

Figure 4:
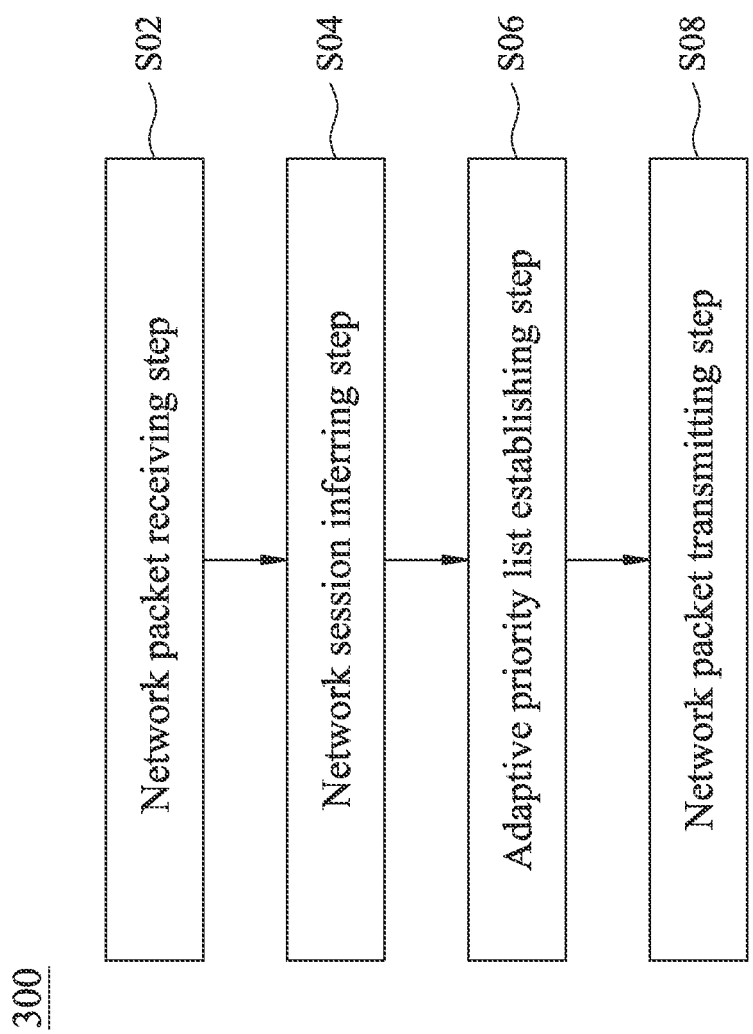
FIG. 4 shows a flow chart of an adaptive quality of service setting method according to a third embodiment of the present disclosure.
Figure 5:
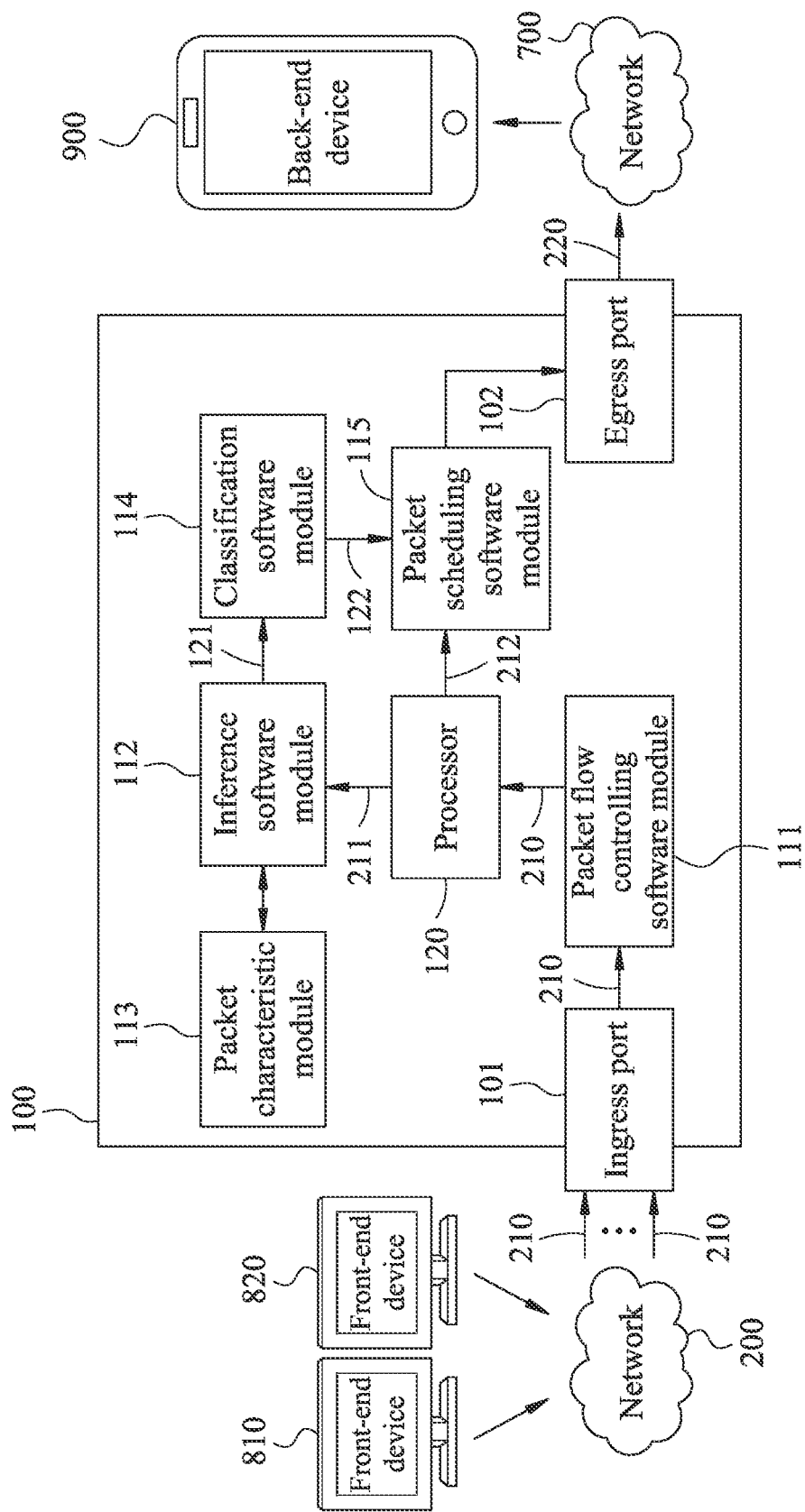
FIG. 5 is a schematic view of the adaptive quality of service setting method of the present disclosure applied to the communication equipment.

Please refer to FIGS. 1, 2, 4 and 5. FIG. 4 shows a flow chart of an adaptive quality of service setting method 300 according to a third embodiment of the present disclosure. FIG. 5 is a schematic view of the adaptive quality of service setting method 300 of the present disclosure applied to communication equipment 100. As shown in FIGS. 4 and 5, the adaptive quality of service setting method 300 includes performing a network packet receiving step S02, a network session inferring step S04, an adaptive priority list establishing step S06 and a network packet transmitting step S08, and is configured to adaptively set the QoS of the network sessions 210 received from the network 200.

The network packet receiving step S02 is performed to configure an ingress port 101 of the communication equipment 100 to receive the network packets 220 of each of the network sessions 210 from the network 200. The processor 120 executes the packet flow controlling software module 111, and the packet flow controlling software module 111 determines whether the first packet group 211 of each of the network sessions 210 has been inferred to be a priority level 121 for which it belongs to. When the communication equipment 100 receives each of the network sessions 210 at the first time, the packet flow controlling software module 111 controls the first packet group 211 and the second packet group 212 of each of the network sessions 210 to be transmitted to the processor 120. It should be noted that, since the inference software module 112 only needs to analyze a sufficient number of the network packets 220 to infer which the priority level 121 for each of the network sessions 210 belongs to, the processor 120 can dynamically adjust a number of 1 to N of the network packets 220 (i.e., the first packet group 211) allowed to enter the inference software module 112 from the processor 120 through the packet flow controlling software module 111, not every one of the network packets 220 needs to be analyzed by the inference software module 112. In other words, the inference software module 112 can infer which the priority level 121 for each of the network sessions 210 belongs to without analyzing the N+1th to Mth network packets 220 (i.e., the second packet group 212).

The network session inferring step S04 is performed to configure the processor 120 to execute the inference software module 112. The inference software module 112 processes the network packets 220 of the first packet group 211 of each of the network sessions 210 and the packet characteristic module 113 according to the machine learning algorithm to infer the priority level 121 for which each of the network sessions 210 belongs to.

The adaptive priority list establishing step S06 is performed to configure the processor 120 to execute the classification software module 114. The classification software module 114 establishes the adaptive priority list 122 according to the priority levels 121 corresponding to the network sessions 210.

The network packet transmitting step S08 is performed to configure the processor 120 of the communication equipment 100 to execute the packet scheduling software module 115. The packet scheduling software module 115 transmits the network packets 220 of each of the network sessions 210 to an egress port 102 of the communication equipment 100 according to the adaptive priority list 122, and then the egress port 102 transmits the network packets 220 of each of the network sessions 210 to the network 700 so as to set the QoS of the network sessions 210.

Please refer to FIGS. 1, 2, 4, 5 and 6. FIG. 6 shows a flow chart of the network session inferring step S04 of the adaptive quality of service setting method 300 of FIG. 4. As shown in FIG. 6, the network session inferring step S04 can include performing a header extracting step S042, an identification number generating step S044 and a priority level determining step S046. The header extracting step S042 is performed to configure the inference software module 112 to extract one or more headers from one or more network packets 220 of the first packet group 211 of each of the network sessions 210. The header can include a session identity information and a packet characteristic information.

The identification number generating step S044 is performed to configure the inference software module 112 to generate an identification number corresponding to each of the network sessions 210 according to a plurality of the session identity information of the network sessions 210. In detail, the session identity information in the header can include the information content of a protocol, an IP source address, a TCP/UDP source port, an IP destination address and a TCP/UDP destination port. Please refer to Table 1, which lists two identification numbers of two network sessions 210 and two protocols, two IP source addresses, two TCP/UDP source ports, two IP destination addresses and two TCP/UDP destination ports, but the present disclosure is not limited to the following Table 1.

TABLE 1

| | identification number | protocol | source address | destination address | source port | destination port |
|---|---|---|---|---|---|---|
| network session 210 | 1 | UDP | 192.168.0.33 | 23.4.5.22 | 31234 | 21 |
| network session 210 | 2 | TCP | 192.168.0.67 | 134.42.3.3 | 23234 | 7852 |

In Table 1, the inference software module 112 infers that the two network sessions 210 are an identification number 1 and an identification number 2 by extracting the session identity information in the header. For example, the two network sessions 210 received from the network 200 by the ingress port 101 of the communication equipment 100 of FIG. 5 are transmitted by a front-end device 810 and a front-end device 820, respectively. When the communication equipment 100 receives the two network sessions 210 at the first time, the communication equipment 100 uses the inference software module 112 to infer that the first packet groups 211 of the two network sessions 210 are the identification number 1 and the identification number 2, respectively. In addition, the communication equipment 100 can learn from the source address (i.e., 192.168.0.33) in Table 1 that the network session 210 corresponding to the identification number 1 is transmitted by the front-end device 810, and can learn from the source address (i.e., 192.168.0.67) in Table 1 that the network session 210 corresponding to the identification number 2 is transmitted by the front-end device 820. In other embodiments, a single front-end device may transmit multiple network sessions. Hence, the communication equipment 100 can learn from different identification numbers and different source addresses that each of the network sessions 210 received from the network 200 is sent by the which one of the front-end devices 810, 820.

The priority level determining step S046 is performed to configure the inference software module 112 to compare a plurality of the packet characteristic information of the network sessions 210 with the packet characteristic module 113 according to the machine learning algorithm to determine the priority level 121 of each of the network sessions 210. Furthermore, the packet characteristic information in the header can include a packet length information and a packet time information. The packet length information includes a packet length of the network packet 220. The packet time information includes an inter-packet timestamp between the current network packet 220 and the previous network packet 220. In detail, when each of the network packets 220 enters the communication equipment 100, the processor 120 will record a timestamp corresponding to each of the network packets 220, and record a difference (i.e., the inter-packet timestamp) between two timestamps of the two network packets 220 transmitted in sequence. In other embodiments, the packet length information can further include a successful packet length. When a connection is successfully created between a communication equipment and a back-end device, the network packet transmitted by the communication equipment is a successive packet, and its length is called the successful packet length. The inference software module can also compare the successful packet length with the packet characteristic module according to the machine learning algorithm. In addition, the aforementioned inter-packet timestamp can also be a difference between two timestamps of two successive packets; in other words, the aforementioned inter-packet timestamp is not limited to the difference between two timestamps of two network packets that are transmitted in sequence. Further, the packet characteristic module 113 stored in the memory 110 can include a plurality of packet characteristic tables. Moreover, the packet characteristic module 113 can be a packet flow matrix formed by normalizing the packet characteristic data of the aforementioned packet characteristic tables. Furthermore, the packet characteristic table can list any combination of the packet lengths, the successful packet lengths and the inter-packet timestamps, and also list a priority level configured according to the aforementioned combination. Please refer to Tables 2 and 3. Table 2 lists one of the packet characteristic tables of the packet characteristic module 113. Table 3 lists another packet characteristic table of the packet characteristic module 113, but the present disclosure is not limited to the following Tables 2 and 3, and the packet characteristic tables of other combinations are not described again herein.

TABLE 2

| packet | packet length (bytes) | inter-packet timestamp (ms) | priority level |
|---|---|---|---|
| 1 | 76 | 0 | 2 |
| 2 | 128 | 101 | 2 |
| 3 | 85 | 96 | 2 |
| ... | ... | ... | 2 |
| 100 | 96 | 120 | 2 |

TABLE 3

| packet | packet length (bytes) | inter-packet timestamp (ms) | priority level |
|---|---|---|---|
| 1 | 1400 | 0 | 4 |
| 2 | 1358 | 603 | 4 |
| 3 | 1268 | 652 | 4 |
| ... | ... | ... | 4 |
| 200 | 1536 | 785 | 4 |

In Table 2, the packet characteristic table lists the packet lengths, the inter-packet timestamps and the priority levels (i.e., level 2) of a packet flow (i.e., the packets 1 to 100). In Table 3, the packet characteristic table lists the packet lengths, the inter-packet timestamps and the priority levels (i.e., level 4) of another packet flow (i.e., the packets 1 to 200).

In priority level determining step S046, the machine learning algorithm used by the inference software module 112 can be a clustering algorithm; preferably, the machine learning algorithm can be a Bayesian algorithm. The inference software module 112 compares the packet characteristic information in the header with the packet characteristic tables of the packet characteristic module 113 according to the machine learning algorithm; in other words, the inference software module 112 can search the parameters that correspond to the packet characteristic information in the packet characteristic module 113 so as to determine the priority level 121 of each of the network sessions 210. In addition, the inference software module 112 can learn an application type corresponding to the priority level 121 after degerming the priority level 121 of each of the network sessions 210. In detail, the inference software module 112 can search the application type corresponding to the priority level 121 of each of the network sessions 210 according to the application type table 117 stored in the memory 110. Please refer to Table 4. Table 4 is the application type table 117 of the present disclosure, and lists a plurality of application types corresponding to different priority levels. In Table 4, the level 1 can be a network voice type (i.e., Voice (VO)), the level 2 can be a network stream type (i.e., Video (VI)), level 3 can be a network basic type (i.e., Best Effort (BE)), and level 4 can be a network download type (i.e., Background (BK)). In other embodiments, the application type corresponding to the priority level of level 1 can also be a game type or other communication type, and the present disclosure is not limited thereto.

TABLE 4

| application type | priority level |
|---|---|
| network voice type | 1 |
| network stream type | 2 |
| network basic type | 3 |
| network download type | 4 |

In Tables 2 to 4, the inference software module 112 extracts an information content of the packet length (e.g., 1435 bytes) and the inter-packet timestamp (e.g., 300 ms) from one of the network sessions 210. Then, the inference software module 112 uses the Bayesian algorithm to search the packet characteristic table (i.e., Table 3) corresponding to the aforementioned information content in the packet characteristic module 113 and infers that the priority level 121 of the one of the network sessions 210 is level 4, and then the inference software module 112 searches from the application type table 117 that the application type corresponding to level 4 is the network download type. Similarly, the inference software module 112 extracts an information content of the packet length (e.g., 86 bytes) and the inter-packet timestamp (e.g., 10 ms) from another network session 210. Then, the inference software module 112 uses the Bayesian algorithm to search the packet characteristic table (i.e., Table 2) corresponding to the aforementioned information content in the packet characteristic module 113 and infers that the priority level 121 of the another network session 210 is level 2, and then the inference software module 112 searches from the application type table 117 that the application type corresponding to level 2 is the network stream type. Therefore, the communication equipment 100 and the adaptive quality of service setting method 300 of the present disclosure can not only automatically identify the priority level 121 for which each of the network sessions 210 belongs to through the machine learning algorithm, but also determine the application types corresponding to the different priority levels 121 according to the application type table 117. In particular, the processor 120 can receive a user command (not shown) and change the application type table 117 according to the user command, and thus the processor 120 executes the classification software module 114, and the classification software module 114 adjusts or replaces the adaptive priority list 122 according to the application type table 117 having been changed. In detail, the user can adjust the application types corresponding to the priority levels in the application type table 117 according to personal preference. For example, the priority level of the network download type in Table 4 is changed from level 4 to level 3. At the same time, the priority level corresponding to the packet length and the inter-packet timestamp of the packet characteristic table (i.e., Table 3) is also changed from level 4 to level 3.

In the communication equipment 100 of FIG. 5, when the first packet group 211 of each of the network sessions 210 has been inferred to belong to the one of the priority levels 121, since the first packet group 211 and the second packet group 212 in the same network session 210 have the same identification number, the processor 120 executes the packet flow controlling software module 111 to identify the identification number of the second packet group 212 and controls both of the first packet group 211 and the second packet group 212 to be transmitted to the processor 120, and then the processor 120 directly executes the packet scheduling software module 115 to transmit the network packets 220 (i.e., the first packet group 211 and the second packet group 212) of each of the network sessions 210 to the egress port 102 of the communication equipment 100 according to the adaptive priority list 122. On the other hand, when the first packet group 211 of each of the network sessions 210 has not been inferred to belong to any one of the priority levels 121, the processor 120 executes the packet flow controlling software module 111 to control the first packet group 211 of each of the network sessions 210 to be transmitted to the processor 120, and the processor 120 sequentially executes the network session inferring step S04 and the adaptive priority list establishing step S06 to establish the adaptive priority list 122.

Figure 8:
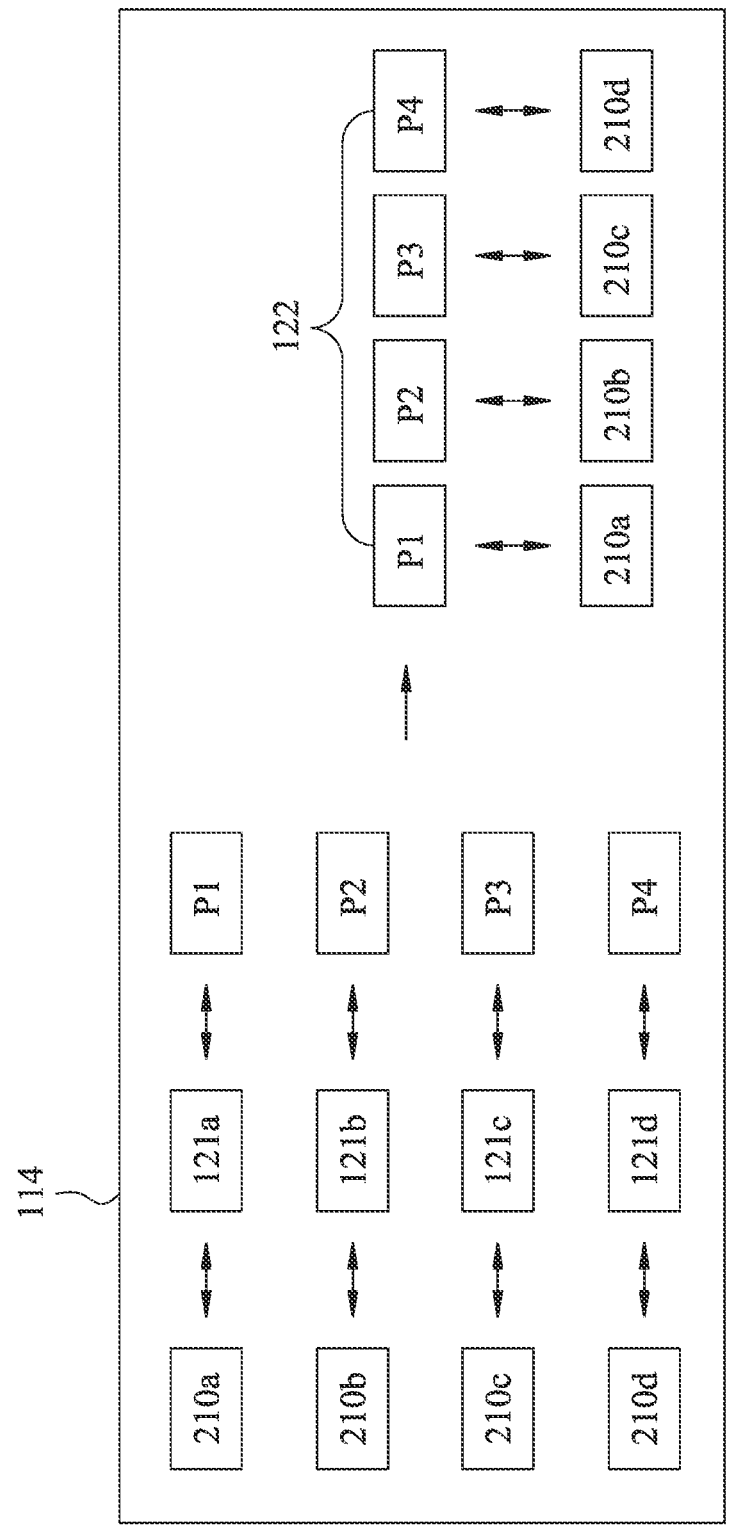
FIG. 8 is a schematic view of a plurality of network sessions, a plurality of first priority labels and an adaptive priority list of the present disclosure.
Figure 9:
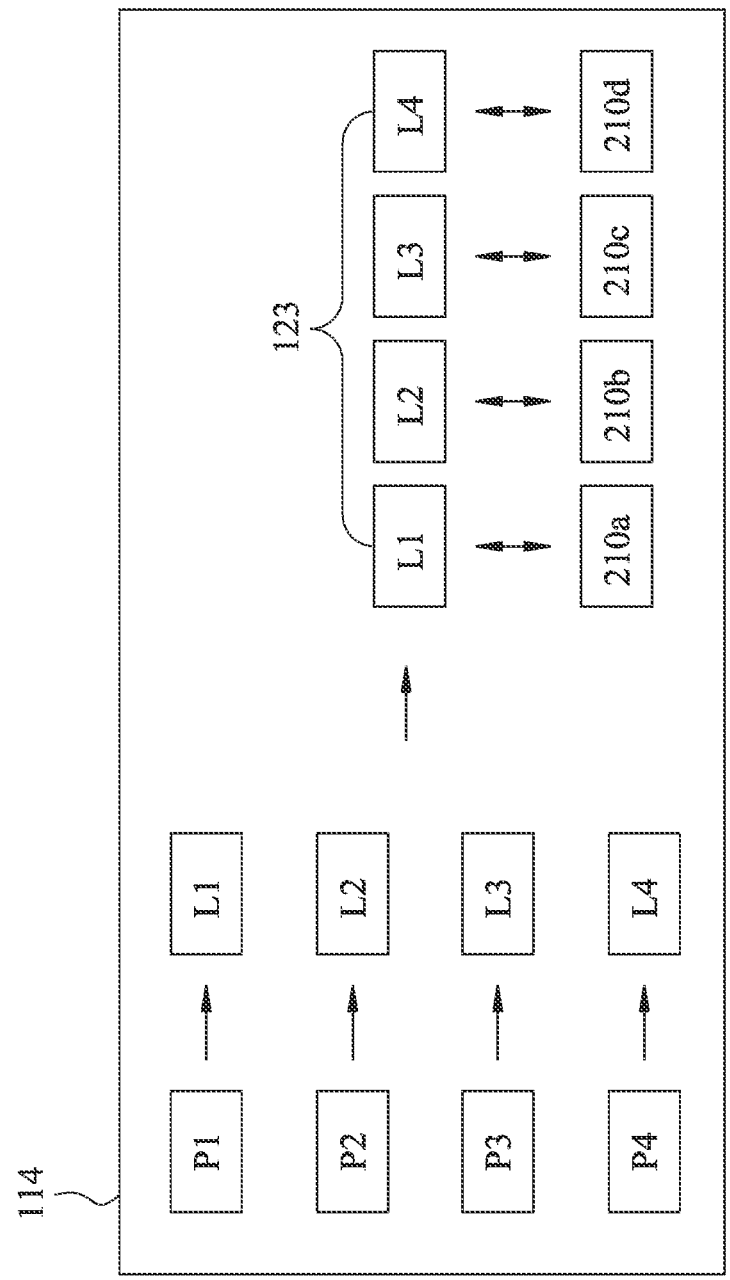
FIG. 9 is a schematic view of a plurality of second priority level labels and an adjusted priority list of the present disclosure.

Please refer to FIGS. 1, 2, 4, 5, 6, 7, 8 and 9. FIG. 7 shows a flow chart of the adaptive priority list establishing step S06 of the adaptive quality of service setting method 300 of FIG. 4. FIG. 8 is a schematic view of a plurality of network sessions 210a, 210b, 210c, 210d, a plurality of first priority labels P1, P2, P3, P4 and an adaptive priority list 122 of the present disclosure. FIG. 9 is a schematic view of a plurality of second priority level labels L1, L2, L3, L4 and an adjusted priority list 123 of the present disclosure. As shown in FIGS. 7, 8 and 9, the adaptive priority list establishing step S06 can include performing a label generating step S062.

The label generating step S062 is performed to configure the classification software module 144 to generate the first priority labels P1, P2, P3, P4 corresponding to a network service (e.g., an Ethernet) according to a plurality of priority levels 121a, 121b, 121c, 121d of the network sessions 210a, 210b, 210c, 210d and sort the first priority labels P1, P2, P3, P4 to establish the adaptive priority list 122. For example, the front-end device 810 and the front-end device 820 transmit a total of four network sessions 210a, 210b, 210c, and 210d to the communication equipment 100 via the Ethernet (i.e., the network 200). The communication equipment 100 uses the inference software module 112 to infer that the priority levels 121a, 121b, 121c, 121d of the network sessions 210a, 210b, 210c, 210d are level 1, level 2, level 3 and level 4, respectively (that is, the priority levels 121a, 121b, 121c, 121d are different from each other). In FIG. 8, the classification software module 114 matches the priority levels 121a, 121b, 121c, 121d to the first priority labels P1, P2, P3, P4, respectively. In detail, the classification software module 114 sets the first priority label P1 to match the priority level 121a belonging to the level 1 (i.e., the network voice type), sets the first priority label P2 to match the priority level 121b belonging to the level 2 (i.e., the network stream type), sets the first priority label P3 to match the priority level 121c belonging to the level 3 (i.e., the network basic type) and sets the first priority label P4 to match the priority level 121d belonging to the level 4 (i.e., the network download type). Subsequently, the classification software module 114 sets QoS rules for the first priority labels P1, P2, P3 and P4 and sorts the first priority labels P1, P2, P3, P4 to generate the adaptive priority list 122. In the adaptive priority list 122, the priority order of the packet transmission is the first priority label P1>the first priority label P2>the first priority label P3>the first priority label P4. Therefore, the packet scheduling software module 115 sequentially transmits the network packets 220 of each of the network sessions 210 based on the first priority labels P1, P2, P3, P4 in the adaptive priority list 122.

Especially, the adaptive priority list establishing step S06 can further include performing a label mapping step S064. The label mapping step S064 is performed to configure the classification software module 114 to map the first priority labels P1, P2, P3, P4 to the second priority labels L1, L2, L3, L4 corresponding to another network service according to the label mapping table 116 stored in the memory 110 and sort the second priority labels L1, L2, L3, L4 to adjust the adaptive priority list 122 as the adjusted priority list 123. Please refer to FIG. 9 and Table 5. Table 5 lists two of the priority levels corresponding to a plurality of network services in the label mapping table 116 of the present disclosure, and the present disclosure is not limited to the following Table 5.

TABLE 5

| | | network service | | | |
|---|---|---|---|---|---|
| | | Ethernet | network slicing | VLAN (ID/ Priority) | routing/ forwarding | wireless network (Wi-Fi) |
| priority level | Low | mission-critical slicing | 100/1 | routing WAN1 | WMM high |
| | high | latency-sensitive slicing | 200/7 | forwarding | WMM low |

For example, the first priority labels P1, P4 in FIG. 9 correspond to the priority level (high) and the priority level (low) of the Ethernet in Table 5, respectively. The classification software module 114 can map the priority level (low) of the Ethernet corresponding to the first priority label P4 to one of the priority level (mission) of the network slicing, the priority level (100/1) of the Virtual Local Area Network (VLAN), the routing WAN1 of the routing/forwarding service and the priority level (WMM high) of the wireless network based on Table 5, wherein the one of the priority level (mission), the priority level (100/1), the routing WAN1 and the priority level (WMM high) is the second priority label L4. Analogously, the mapping relationships between the first priority labels P1, P2, P3 and the second priority labels L1, L2, L3 are not described again herein. Hence, the classification software module 114 can map the first priority labels P1, P2, P3, P4 corresponding to the Ethernet to the second priority labels L1, L2, L3, L4 corresponding to another network service according to the label mapping table 116, respectively. Therefore, when the network 700 at the back end of the communication equipment 100 is signally connected to a back-end device 900 (e.g., 5G mobile phone, Wi-Fi router) using other network services, the communication equipment 100 can still sort the second priority labels L1, L2, L3, L4 to generate the adjusted priority list 123 and adaptively set the QoS of each of the network sessions 210 according to the adjusted priority list 123. Therefore, the communication equipment 100 and the adaptive quality of service setting method 300 of the present disclosure can use the machine learning algorithm to infer the priority levels 121a, 121b, 121c, 121d of the network sessions 210a, 210b, 210c, 210d. Then, the different priority levels 121a, 121b, 121c, 121d are sorted to establish the adaptive priority list 122, and then the network packets 220 of each of the network sessions 210a, 210b, 210c, 210d are transmitted according to the adaptive priority list 122, thereby avoiding service degradations caused by the continual competition among applications and reducing the network packet delays and the packet dropouts of the network packets 220. In addition, the communication equipment 100 can automatically change or set the adaptive priority list 122 to the adjusted priority list 123 according to the network service used by the back-end device 900 through the label mapping table 116, so that the transmission mechanism of queuing/dequeuing/forwarding/routing of different priorities can be implemented in various network services.

Figure 10:
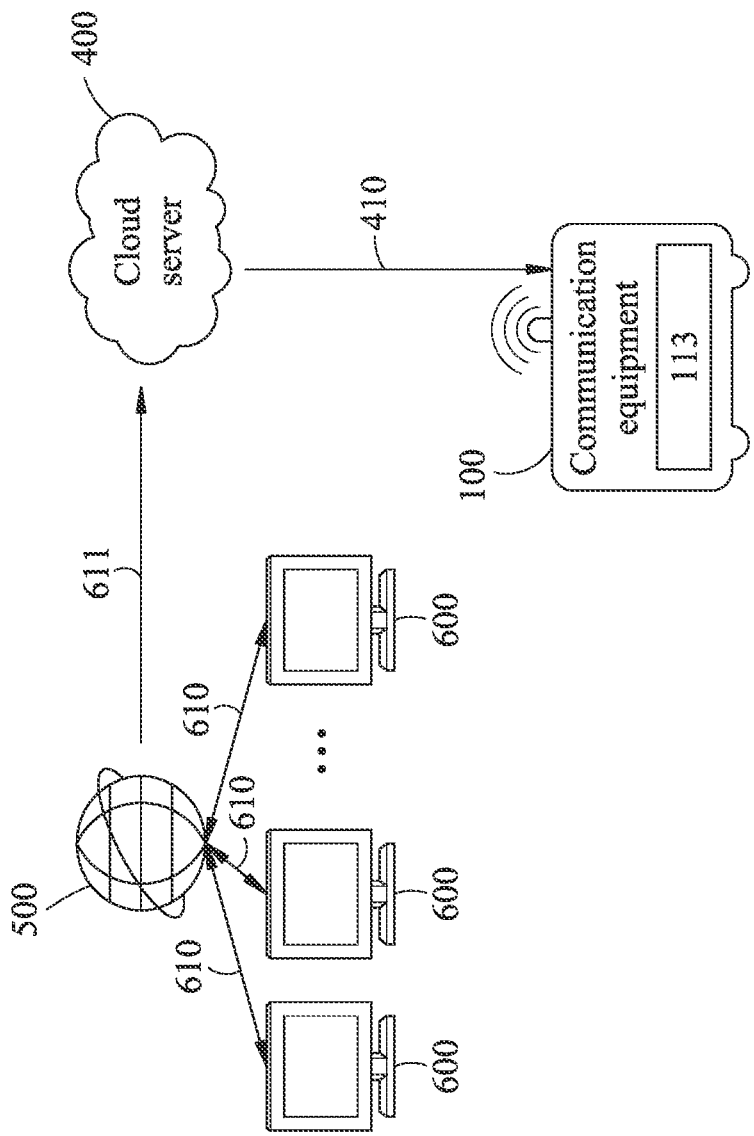
FIG. 10 is a schematic view of a packet characteristic module updated by the communication equipment of the present disclosure.

Please refer to FIGS. 1 and 10. FIG. 10 is a schematic view of the packet characteristic module 113 updated by the communication equipment 100 of the present disclosure. As shown in FIG. 10, the communication equipment 100 is signally connected to a cloud server 400 and receives an updated packet characteristic module 410 from the cloud server 400. The processor 120 updates the packet characteristic module 113 stored in the memory 110 through the updated packet characteristic module 410. In detail, the cloud server 400 can continuously collect a plurality of network sessions 610 of a plurality of data communication equipment 600 from an Internet 500, and extract the packet characteristic information 611 of the network packets in each of the network sessions 610 for repeatedly adjusting and modifying the updated packet characteristic module 410 stored in the local database of the cloud server 400. Therefore, the communication equipment 100 of the present disclosure can continuously update the packet characteristic module 113 through the interactive connection with the cloud server 400, thereby improving the accuracy of the inference software module 112 for inferring the priority levels 121 of each of the network sessions 210.

Figure 11:
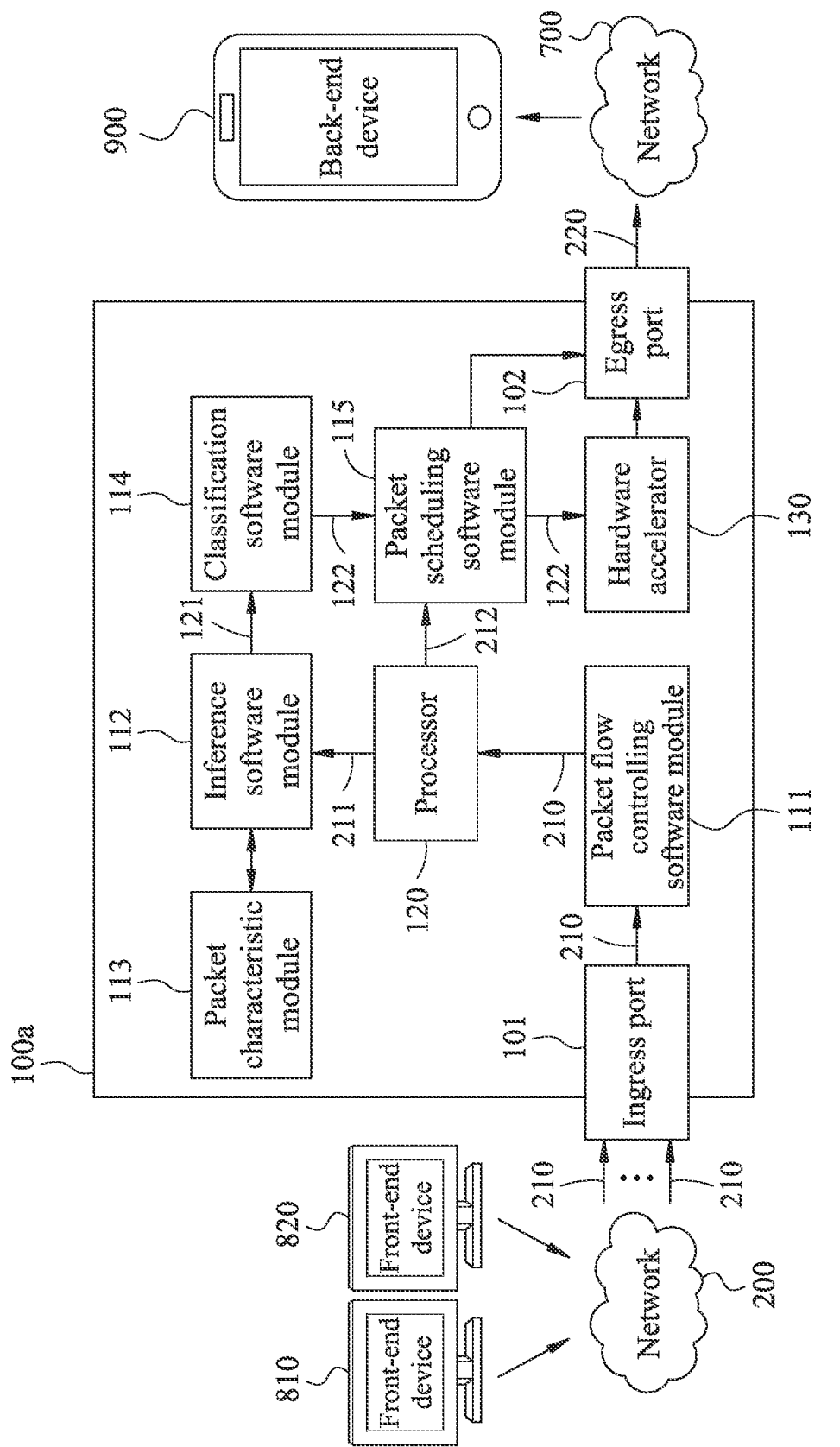
FIG. 11 is a schematic view of the adaptive quality of service setting method of the present disclosure applied to another communication equipment.

Please refer to FIG. 11. FIG. 11 is a schematic view of the adaptive quality of service setting method 300 of the present disclosure applied to another communication equipment 100a. Different from the adaptive quality of service setting method 300 applied to the communication equipment 100 in FIG. 5, the adaptive quality of service setting method 300 configures the processor 120 to execute the packet scheduling software module 115, and the packet scheduling software module 115 writes the adaptive priority list 122 into the hardware accelerator 130. In the communication equipment 100a of FIG. 11, when the first packet group 211 of each of the network sessions 210 has been inferred to belong to the one of the priority levels 121, since the first packet group 211 and the second packet group 212 in the same network session 210 have the same identification number, the processor 120 executes the packet flow controlling software module 111 to identify the identification number of the second packet group 212 and controls both of the first packet group 211 and the second packet group 212 to be transmitted to the processor 120, and then the processor 120 executes the packet scheduling software module 115 to transmit the first packet group 211 and the second packet group 212 to the hardware accelerator 130. The hardware accelerator 130 directly transmits the network packets 220 (i.e., the first packet group 211 and the second packet group 212) to the egress port 102 according to the adaptive priority list 122, and then the network packets 220 of each of the network sessions 210 are transmitted from the egress port 102 to the network 700 so as to set the QoS of the network sessions 210. On the other hand, when the first packet group 211 of each of the network sessions 210 has not been inferred to belong to any one of the priority levels 121, the processor 120 executes the packet flow controlling software module 111 to control the first packet group 211 of each of the network sessions 210 to be transmitted to the processor 120, and the processor 120 sequentially executes the network session inferring step S04 and the adaptive priority list establishing step S06 to establish the adaptive priority list 122.

Figure 12:
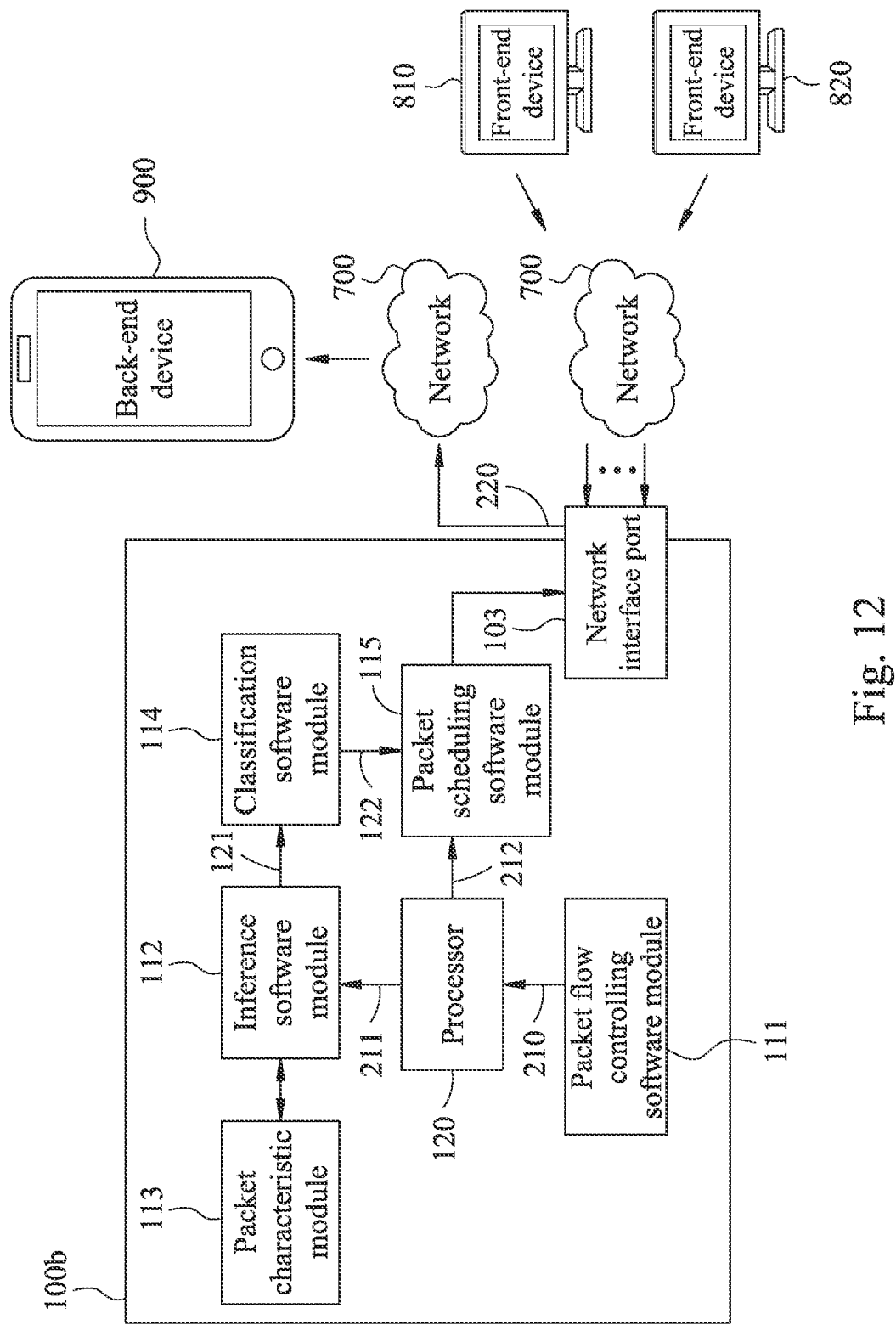
FIG. 12 is a schematic view of the adaptive quality of service setting method of the present disclosure applied to yet another communication equipment.

Please refer to FIG. 12. FIG. 12 is a schematic view of the adaptive quality of service setting method 300 of the present disclosure applied to yet another communication equipment 100b. Different from the adaptive quality of service setting method 300 applied to the communication equipment 100 in FIG. 5, the communication equipment 100b has a network interface port 103, which can be regarded as a kind of egress and ingress port, and configured to receive the network sessions 210 and sends the network packets 220 of the network sessions 210. The network packet receiving step S02 of the adaptive quality of service setting method 300 configures the network interface port 103 of the communication equipment 100b to receive the network sessions 210 transmitted by the front-end device 810 and the front-end device 820 from the network 200. Further, the network packet transmitting step S08 of the adaptive quality of service setting method 300 configures the processor 120 of the communication equipment 100b to execute the packet scheduling software module 115, and the packet scheduling software module 115 transmits the network packets 220 of each of the network sessions 210 to the network interface port 103 according to the adaptive priority list 122, and then the network interface port 103 transmits the network packets 220 of each of the network sessions 210 to the network 700 so as to set the QoS of the network sessions 210.

According to the aforementioned embodiments and examples, the advantages of the present disclosure are described as follows.

1. The priority levels of each of the network sessions is inferred through the machine learning algorithm, and the QoS of the network sessions can be adaptively set based on the adaptive priority list.
2. The communication equipment of the present disclosure can automatically change or set the adaptive priority list to the adjusted priority list according to different network services through the label mapping table, so that the transmission mechanism of queuing/dequeuing/forwarding/routing of different priorities can be implemented in various network services.
3. The communication equipment of the present disclosure can continuously update the packet characteristic module through the interactive connection with the cloud server, thereby improving the accuracy for inferring the priority levels.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A communication equipment, which is connected to a network and configured to adaptively set a Quality of Service (QOS) of a plurality of network sessions received from the network, and the communication equipment comprising:
   a memory storing an inference software module, a classification software module and a packet characteristic module; and
   a processor connected to the memory and configured to implement an adaptive quality of service setting method comprising:
   performing a network session inferring step to configure the processor to execute the inference software module, wherein the inference software module processes at least one network packet of each of the network sessions and the packet characteristic module according to a machine learning algorithm to infer a priority level for which each of the network sessions belongs to; and
   performing an adaptive priority list establishing step to configure the processor to execute the classification software module, wherein the classification software module establishes an adaptive priority list according to a plurality of the priority levels corresponding to the network sessions;
   wherein the communication equipment transmits a plurality of the network packets of each of the network sessions to the network according to the adaptive priority list so as to set the QoS of the network sessions;
   wherein the inference software module searches an application type corresponding to the priority level of each of the network sessions according to an application type table, the processor receives a user command and changes the application type table according to the user command, and the classification software module adjusts or replaces the adaptive priority list according to the application type table having been changed.

2. The communication equipment of claim 1, wherein the memory further stores a packet scheduling software module, the processor executes the packet scheduling software module, and the packet scheduling software module transmits the network packets of each of the network sessions to the network according to the adaptive priority list.

3. The communication equipment of claim 2, further comprising:
   a hardware accelerator connected to the processor;
   wherein the packet scheduling software module writes the adaptive priority list into the hardware accelerator, and the hardware accelerator transmits the network packets of each of the network sessions to the network according to the adaptive priority list.

4. The communication equipment of claim 3, wherein the memory further stores a packet flow controlling software module, the network packets of each of the network sessions are grouped into a first packet group and a second packet group, the processor executes the packet flow controlling software module, and the packet flow controlling software module determines whether the first packet group has been inferred to belong to one of the priority levels;
   wherein when the first packet group has been inferred to belong to the one of the priority levels, the packet flow controlling software module controls the first packet group and the second packet group to be transmitted to the processor, the processor executes the packet scheduling software module to transmit the first packet group and the second packet group to the hardware accelerator, and the hardware accelerator transmits the first packet group and the second packet group of each of the network sessions to the network according to the adaptive priority list;
   wherein when the first packet group has not been inferred to belong to any one of the priority levels, the packet flow controlling software module controls the first packet group to be transmitted to the processor, and the processor sequentially executes the network session inferring step and the adaptive priority list establishing step.

5. The communication equipment of claim 1, wherein the memory further stores a packet flow controlling software module, the network packets of each of the network sessions are grouped into a first packet group and a second packet group, the processor executes the packet flow controlling software module, and the packet flow controlling software module determines whether the first packet group has been inferred to belong to one of the priority levels;
   wherein when the first packet group has been inferred to belong to the one of the priority levels, the packet flow controlling software module controls the first packet group and the second packet group to be transmitted to the processor, and the processor transmits the first packet group and the second packet group of each of the network sessions to the network according to the adaptive priority list;
   wherein when the first packet group has not been inferred to belong to any one of the priority levels, the packet flow controlling software module controls the first packet group to be transmitted to the processor, and the processor sequentially executes the network session inferring step and the adaptive priority list establishing step.

6. The communication equipment of claim 1, wherein the network session inferring step comprises:
   performing a header extracting step to configure the inference software module to extract a header from the at least one network packet of each of the network sessions, wherein the header comprises a session identity information and a packet characteristic information;
   performing an identification number generating step to configure the inference software module to generate an identification number corresponding to each of the network sessions according to a plurality of the session identity information of the network sessions; and
   performing a priority level determining step to configure the inference software module to compare a plurality of the packet characteristic information of the network sessions with the packet characteristic module according to the machine learning algorithm to determine the priority level of each of the network sessions.

7. The communication equipment of claim 6, wherein the packet characteristic information comprises a packet length information or a packet time information.

8. The communication equipment of claim 1, wherein the adaptive priority list establishing step comprises:
    performing a label generating step to configure the classification software module to generate a plurality of first priority labels corresponding to a network service according to the priority levels of the network sessions and sort the first priority labels to establish the adaptive priority list.

9. The communication equipment of claim 8, wherein the memory further stores a label mapping table, and the adaptive priority list establishing step further comprises:
    performing a label mapping step to configure the classification software module to map the first priority labels to a plurality of second priority labels corresponding to another network service according to the label mapping table and sort the second priority labels to adjust the adaptive priority list.

10. The communication equipment of claim 1, wherein the communication equipment is signally connected to a cloud server and receives an updated packet characteristic module from the cloud server, and the processor updates the packet characteristic module stored in the memory through the updated packet characteristic module.

11. An adaptive quality of service setting method, which is configured to adaptively set a Quality of Service (QOS) of a plurality of network sessions received from a network, and the adaptive quality of service setting method comprising:
    performing a network packet receiving step to configure a communication equipment to receive a plurality of network packets of each of the network sessions from the network, wherein the communication equipment comprises a processor and a memory, and the memory stores an inference software module, a classification software module and a packet characteristic module;
    performing a network session inferring step to configure the processor to execute the inference software module, wherein the inference software module processes at least one of the network packets of each of the network sessions and the packet characteristic module according to a machine learning algorithm to infer a priority level for which each of the network sessions belongs to;
    performing an adaptive priority list establishing step to configure the processor to execute the classification software module, wherein the classification software module establishes an adaptive priority list according to a plurality of the priority levels corresponding to the network sessions; and
    performing a network packet transmitting step to configure the communication equipment to transmit the network packets of each of the network sessions to the network according to the adaptive priority list so as to set the QoS of the network sessions;
    wherein the inference software module searches an application type corresponding to the priority level of each of the network sessions according to an application type table, the processor receives a user command and changes the application type table according to the user command, and the classification software module adjusts or replaces the adaptive priority list according to the application type table having been changed.

12. The adaptive quality of service setting method of claim 11, wherein the memory further stores a packet scheduling software module, and the network packet transmitting step comprises:
    configuring the processor to execute the packet scheduling software module, wherein the packet scheduling software module transmits the network packets of each of the network sessions to the network according to the adaptive priority list.

13. The adaptive quality of service setting method of claim 12, wherein the communication equipment further comprises a hardware accelerator, the packet scheduling software module writes the adaptive priority list into the hardware accelerator, and the network packet transmitting step further comprises:
    configuring the hardware accelerator to transmit the network packets of each of the network sessions to the network according to the adaptive priority list.

14. The adaptive quality of service setting method of claim 13, wherein the memory further stores a packet flow controlling software module, the network packets of each of the network sessions are grouped into a first packet group and a second packet group, and the network packet receiving step comprises:
    configuring the processor to execute the packet flow controlling software module, wherein the packet flow controlling software module determines whether the first packet group has been inferred to belong to one of the priority levels;
    wherein when the first packet group has been inferred to belong to the one of the priority levels, the packet flow controlling software module controls the first packet group and the second packet group to be transmitted to the processor, the processor executes the packet scheduling software module to transmit the first packet group and the second packet group to the hardware accelerator, and the hardware accelerator transmits the first packet group and the second packet group of each of the network sessions to the network according to the adaptive priority list;
    wherein when the first packet group has not been inferred to belong to any one of the priority levels, the packet flow controlling software module controls the first packet group to be transmitted to the processor, and the processor sequentially executes the network session inferring step and the adaptive priority list establishing step.

15. The adaptive quality of service setting method of claim 11, wherein the memory further stores a packet flow controlling software module, the network packets of each of the network sessions are grouped into a first packet group and a second packet group, the processor executes the packet flow controlling software module, and the packet flow controlling software module determines whether the first packet group has been inferred to belong to one of the priority levels;
    wherein when the first packet group has been inferred to belong to the one of the priority levels, the packet flow controlling software module controls the first packet group and the second packet group to be transmitted to the processor, and the processor transmits the first packet group and the second packet group of each of the network sessions to the network according to the adaptive priority list;
    wherein when the first packet group has not been inferred to belong to any one of the priority levels, the packet flow controlling software module controls the first packet group to be transmitted to the processor, and the processor sequentially executes the network session inferring step and the adaptive priority list establishing step.

16. The adaptive quality of service setting method of claim 11, wherein the network session inferring step comprises:
   performing a header extracting step to configure the inference software module to extract a header from the at least one of the network packets of each of the network sessions, wherein the header comprises a session identity information and a packet characteristic information;
   performing an identification number generating step to configure the inference software module to generate an identification number corresponding to each of the network sessions according to a plurality of the session identity information of the network sessions; and
   performing a priority level determining step to configure the inference software module to compare a plurality of the packet characteristic information of the network sessions with the packet characteristic module according to the machine learning algorithm to determine the priority level of each of the network sessions.

17. The adaptive quality of service setting method of claim 16, wherein the packet characteristic information comprises a packet length information or a packet time information.

18. The adaptive quality of service setting method of claim 11, wherein the adaptive priority list establishing step comprises:
   performing a label generating step to configure the classification software module to generate a plurality of first priority labels corresponding to a network service according to the priority levels of the network sessions and sort the first priority labels to establish the adaptive priority list.

19. The adaptive quality of service setting method of claim 18, wherein the memory further stores a label mapping table, and the adaptive priority list establishing step further comprises:
   performing a label mapping step to configure the classification software module to map the first priority labels to a plurality of second priority labels corresponding to another network service according to the label mapping table and sort the second priority labels to adjust the adaptive priority list.

20. A communication equipment, which is connected to a network and configured to adaptively set a Quality of Service (QOS) of a plurality of network sessions received from the network, and the communication equipment comprising:
   a memory storing an inference software module, a classification software module and a packet characteristic module; and
   a processor connected to the memory and configured to implement an adaptive quality of service setting method comprising:
      performing a network session inferring step to configure the processor to execute the inference software module, wherein the inference software module compares at least one packet characteristic information of at least one network packet of each of the network sessions with a plurality of packet characteristic tables of the packet characteristic module according to a machine learning algorithm to infer a priority level for which each of the network sessions belongs to; and
      performing an adaptive priority list establishing step to configure the processor to execute the classification software module, wherein the classification software module establishes an adaptive priority list according to a plurality of the priority levels corresponding to the network sessions;
   wherein the communication equipment transmits a plurality of the network packets of each of the network sessions to the network according to the adaptive priority list so as to set the QoS of the network sessions.

21. The communication equipment of claim 20, wherein the at least one packet characteristic information comprises a packet length information or a packet time information.

22. An adaptive quality of service setting method, which is configured to adaptively set a Quality of Service (QOS) of a plurality of network sessions received from a network, and the adaptive quality of service setting method comprising:
   performing a network packet receiving step to configure a communication equipment to receive a plurality of network packets of each of the network sessions from the network, wherein the communication equipment comprises a processor and a memory, and the memory stores an inference software module, a classification software module and a packet characteristic module;
   performing a network session inferring step to configure the processor to execute the inference software module, wherein the inference software module compares at least one packet characteristic information of at least one of the network packets of each of the network sessions with a plurality of packet characteristic tables of the packet characteristic module according to a machine learning algorithm to infer a priority level for which each of the network sessions belongs to;
   performing an adaptive priority list establishing step to configure the processor to execute the classification software module, wherein the classification software module establishes an adaptive priority list according to a plurality of the priority levels corresponding to the network sessions; and
   performing a network packet transmitting step to configure the communication equipment to transmit the network packets of each of the network sessions to the network according to the adaptive priority list so as to set the QoS of the network sessions.

23. The adaptive quality of service setting method of claim 22, wherein the at least one packet characteristic information comprises a packet length information or a packet time information.

* * * * *